May 5, 1964  J. G. VEATCH, JR  3,132,196
METHOD FOR MOLDING AN ANNULAR RING OF INSULATING
MATERIAL TO A FLAT METAL STRIP
Filed May 24, 1961  4 Sheets-Sheet 1
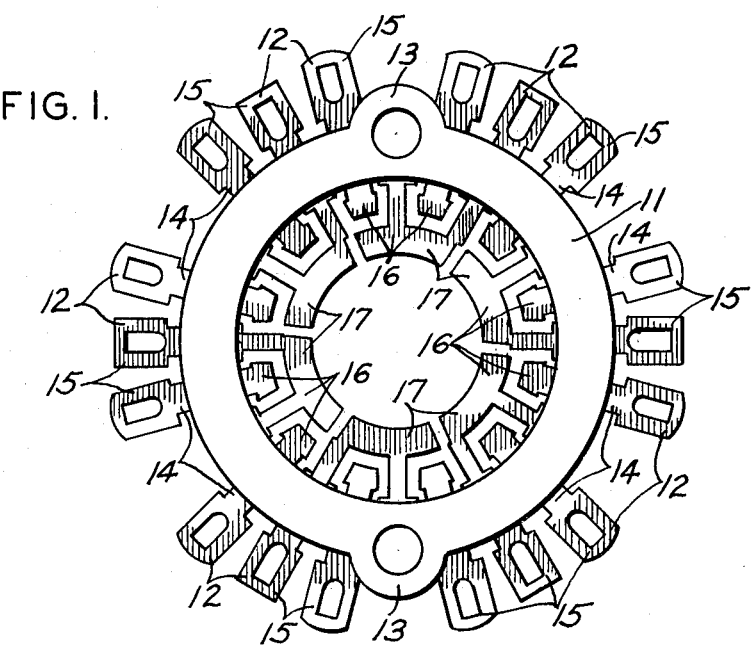
FIG. 1.
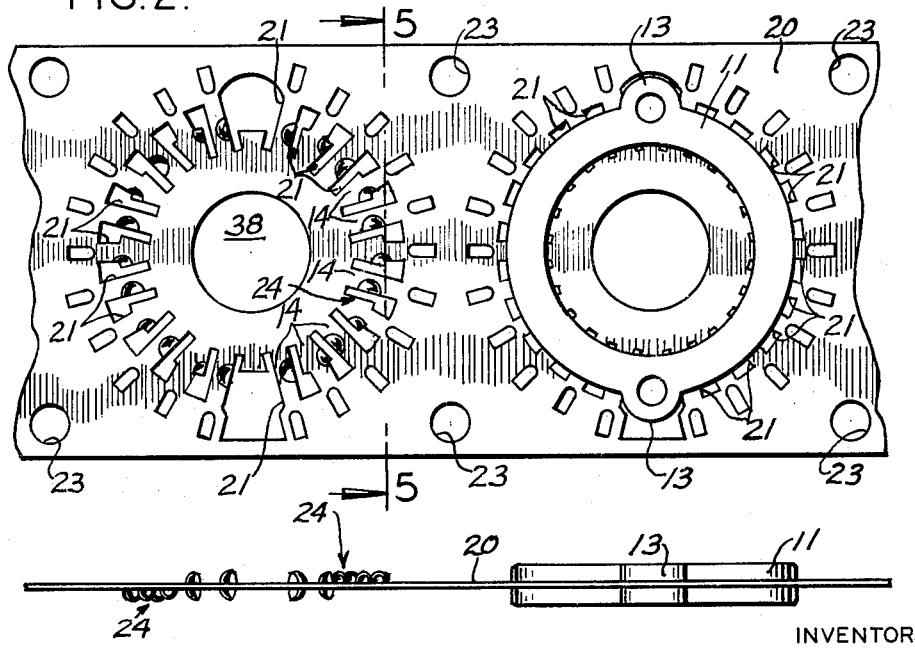
FIG. 2.
FIG. 3.
INVENTOR
JOSEPH G. VEATCH, Jr.
BY
ATTORNEY May 5, 1964  J. G. VEATCH, JR  3,132,196
METHOD FOR MOLDING AN ANNULAR RING OF INSULATING
MATERIAL TO A FLAT METAL STRIP
Filed May 24, 1961  4 Sheets-Sheet 2

INVENTOR
JOSEPH G. VEATCH, Jr.
BY Jennings B. Thompson
ATTORNEY

May 5, 1964   J. G. VEATCH, JR   3,132,196
METHOD FOR MOLDING AN ANNULAR RING OF INSULATING
MATERIAL TO A FLAT METAL STRIP
Filed May 24, 1961   4 Sheets-Sheet 3

INVENTOR
JOSEPH G. VEATCH, Jr.
BY
ATTORNEY

May 5, 1964 J. G. VEATCH, JR 3,132,196
METHOD FOR MOLDING AN ANNULAR RING OF INSULATING
MATERIAL TO A FLAT METAL STRIP
Filed May 24, 1961 4 Sheets-Sheet 4

*INVENTOR.*
JOSEPH G. VEATCH, Jr.
BY *Jennings B. Thompson*
ATTORNEY

United States Patent Office 3,132,196
Patented May 5, 1964

3,132,196
METHOD FOR MOLDING AN ANNULAR RING OF INSULATING MATERIAL TO A FLAT METAL STRIP
Joseph G. Veatch, Jr., Elkhart, Ind., assignor to CTS Corporation, Elkhart, Ind., a corporation of Indiana
Filed May 24, 1961, Ser. No. 112,248
4 Claims. (Cl. 264—272)

This invention relates to the manufacture of rotary electric switches used extensively in television and radio receivers wherein a rotatable contactor is selectively engageable with various stationary contacts arranged in a circle. More particularly, this invention concerns the method of making the stator of such switch and has as its purpose to improve the molding apparatus used in its manufacture.

The co-pending applications of Kenneth C. Allison, Serial No. 703,890 now Patent No. 2,988,606, and Serial No. 5,686, now Patent No. 2,993,487, filed December 19, 1957, and February 1, 1960, respectively, both of which are assigned to the same assignee as this application, illustrate an electric switch of the type to which this invention pertains. The first application relates to the particular structure of the switch, whereas the second application is directed toward an improved method of manufacturing the switch which increases the bond between the two halves of the molded body formed on opposite sides of the metal strip.

Both of these applications deal with the manufacturing process known as molding on strip, which is ideally suited to the production of stators for rotary switches of this type. These stators comprise annular rings of insulating material in which are embedded individual contact members which are formed in a metallic strip and which remain attached to the metallic strip throughout the manufacturing process.

Briefly describing the manufacturing operation, the contact fingers are stamped from a flat blank of sheet metal and are partially defined by successively stamping groups of perforations in an elongated strip of sheet metal. The perforations of each group are so arranged and disposed with respect to one another that the portions of the metal strip between them form circles of substantially radially disposed fingers. The medial portions of these fingers are subsequently embedded in a ring of molded plastic while the fingers are still integrally attached to the strip. Thereafter, the projecting portions of the fingers, both inner and outer, are severed from the strip and given their final shape.

The overall manufacturing process, as fully described in the above mentioned application, Serial No. 5,686, comprises a stamping step to form the perforations in the strip, a cleaning step, a molding step, a circuitry forming step, a plating step and the final step of severing the completed stator from the metal strip. The important feature of the invention is the fact that the product remains attached to and is carried through all of the manufacturing steps by the metal strip from which all the metal parts are obtained.

As in the co-pending application, Serial No. 5,686, this application is concerned with improving the quality of the annular ring of insulating material which forms the body of the stator. This application deals with the elimination of the vertical knitline formed when the two streams of molten insulating material meet after each has traveled half way around the mold cavity from the gate. This type knitline results when the leading portion of each stream partially solidifies as it travels around the mold. Being partially solidified, the lead portions of each stream do not intermix properly when they meet, resulting in a poor bond between the two and producing a weak point in the molded annular ring. This point is referred to as the "vertical" knitline as opposed to the "horizontal" knitline which is formed along the plane of the metal strip. These knitlines were so named because in the mold the knitlines were formed in vertical and horizontal planes respectively.

It is the principal object of this invention to provide a mold for forming an annular ring on a metal strip which has no vertical knitline but which is a homogeneous body of insulating material. It is a further object of this invention to provide a mold which is equipped with means for forcing out of the mold that portion of the insulating material which first enters the mold cavity and which partially solidifies before the mold is completely filled.

The invention can be briefly described as comprising a bleed hole located diametrically opposite the gate through which the insulating material enters the mold. By forcing more material into the mold than is required to fill the mold, the portion which entered first is forced out of the mold through the bleed hole and into a reservoir, thus leaving only molten insulating material in the mold which will then solidify into a homogeneous body.

The invention will now be described in detail in conjunction with the attached drawings in which:

FIGURE 1 is a plan view of the completed stator molded in accordance with the invention;

FIGURE 2 illustrates the strip as it appears before and after having the annular ring of insulating material molded thereto;

FIGURE 3 is a side view of the strip of metal shown in FIGURE 2;

Figure 4:
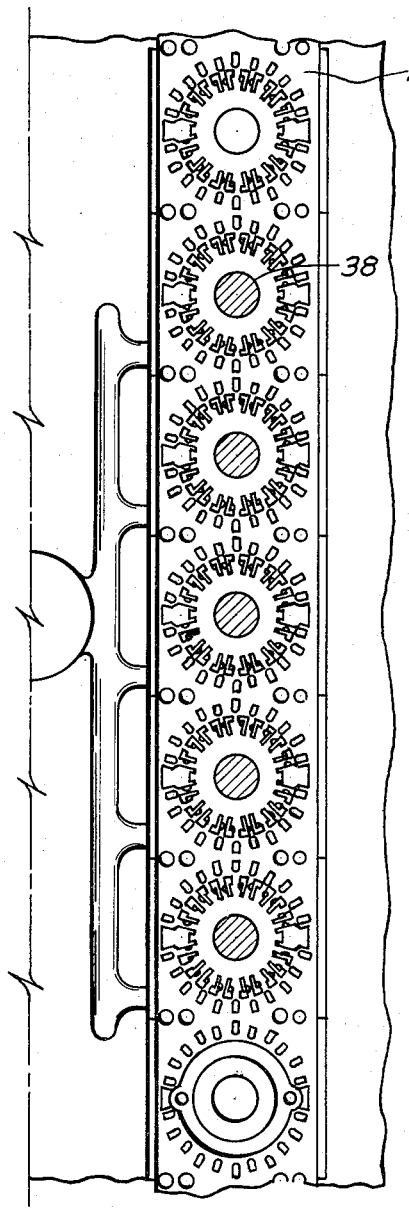
FIGURE 4 is a plan view of the lower half of a five cavity mold showing the metal strip in position preparatory to closing the mold.

Referring now particularly to the accompanying drawings, the finished stator unit shown in FIGURE 1 comprises a carrier ring 11 molded of suitable insulating material and to which a plurality of contacts 12 are fixed by having portions thereof embedded in the ring.

The ring 11 has perforated, diametrically opposite ears 13 by which the unit may be assembled into a rotary switch. The switch has not been illustrated since the present invention concerns only the method of making the stator unit of the switch. Moreover, reference may be made to the aforesaid co-pending applications, Serial No. 703,980 and Serial No. 5,686, for a disclosure of the type of switch for which the illustrated stator unit is intended.

The individual contacts 12 are stamped from sheet metal and comprise a circle of separate, angularly spaced fingers 14 disposed substantially radially with respect to the ring 11. They have outer terminal portions or solder lugs 15 and inner contact portions 16 with which one or more rotor contacts (not shown) coact when the stator unit is embodied in a complete rotary switch.

The specific shape and relationship between individual contact portions 16 depends upon the purpose for which the switch is intended. Hence, the structure illustrated in FIGURE 1 is only illustrative. As here shown, certain of the contacts are interconnected by arcuate portions 17 and not all of the contact fingers have terminals, since only one terminal is needed for each of the arcuate portions 17.

To produce the stator unit of FIGURE 1, in accordance with the present invention, an elongated strip of metal 20 is fed stepwise through a punch press (not shown) which punches a group of perforations 21 into the strip with each operation. These perforations 21 are so arranged and disposed with respect to one another that they define the aforesaid circle of substantially radially disposed fingers 14 which, in subsequent operations, become the contacts 12. Obviously, of course, the punch press has indexing means to index the strip along, and pilot pins which enter pilot holes 23 to properly hold the strip against shifting during the punching operation. The pilot holes 23 are also employed to assure proper registration during the severance of the embedded contacts from the blank or strip 20 after the molding operation described below.

Except for small projections or protrusions designated generally by the numeral 24, which project from the fingers 14 to one side or the other side of the strip, the fingers are coplanar with one another and with the remainder of the strip 20. The projections or protrusions 24 have several purposes, all of which are fully set out in the above mentioned co-pending application, Serial No. 5,686. Suffice it to say here that they are used to create turbulence in the mold and to divert the molten insulating material from one side to the other of the metal strip through the perforations to eliminate any possibility of a weak knitline forming along the horizontal plane of the metal strip.

These deflectors eliminated the horizontal knitline problem. This invention is directed toward solving the vertical knitline problem which as set out above resulted from the fact that the front portion of each of the two streams of insulating material flowing around the annular mold cavity from the gate solidified partially as it traveled through the mold cavity and when the two streams of molten material met opposite the gate, these partially solidified portions would prevent the two streams from intermingling and knitting together properly. This would result in an extremely weak point in the annular ring which was very undesirable.

Figure 5:
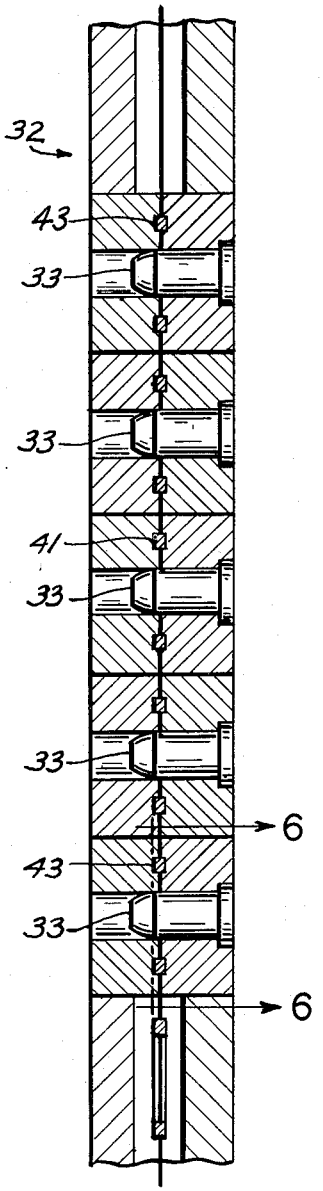
FIGURE 5 is a section through the five cavity mold illustrated in FIGURE 4 showing the relationship of the guide pins and the strip when the mold is closed.

In the molding operation, the perforated strip which has been properly cleaned is unrolled and passed through a heater to raise the temperature of the strip to that of the mold, and then stepwise, through a multiple cavity mold as illustrated in FIGURES 4 and 5. Any suitable molding machine or plastic press may be used for this purpose; and likewise, any suitable insulating material which lends itself to being molded in a plastic press may be employed. It is preferable, though, to use a material which contains reinforcing fibers as, for instance, an alkyd resin containing glass fibers. It should also be a thermo setting plastic which can be liquified under pressure so that it can be forced to completely fill the mold and which will then solidify as a result of continued heating of the mold.

Figure 6:
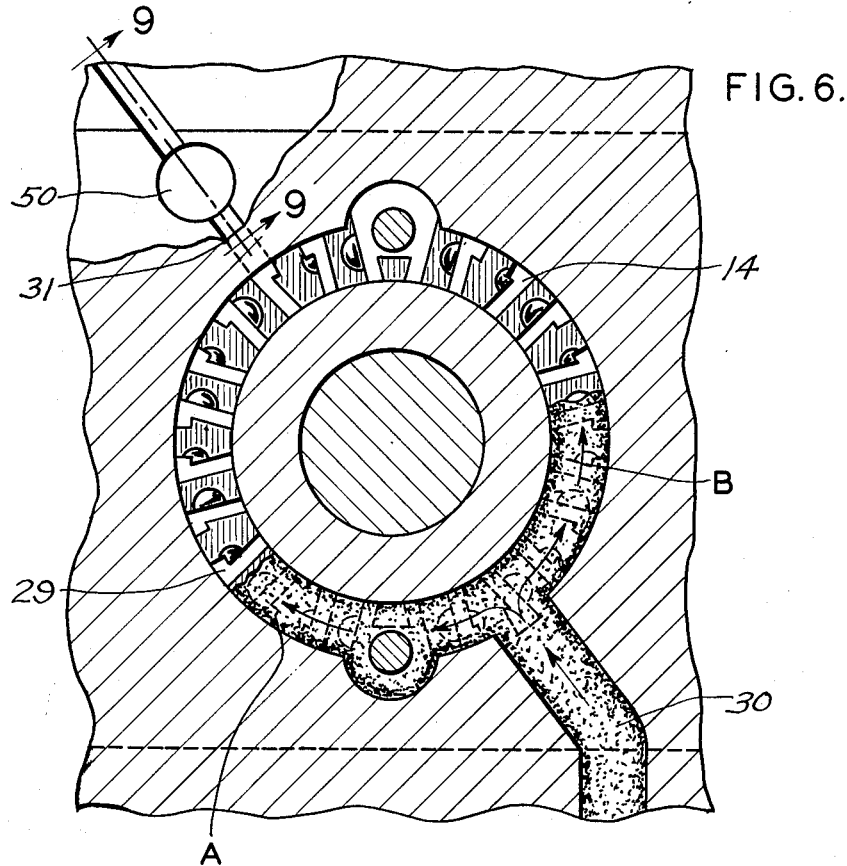
FIGURE 6 is a sectional view taken through the mold on line 6—6 of FIGURE 5 illustrating the location of the gate and bleed hold and reservoir provided for each mold cavity.
Figure 9:
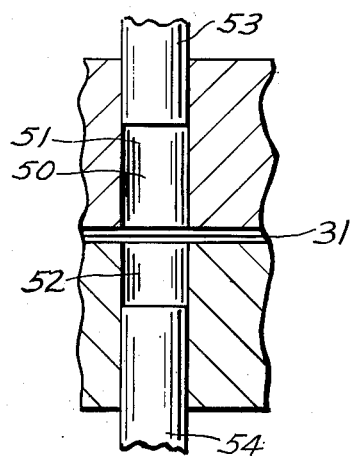
Figure 7:
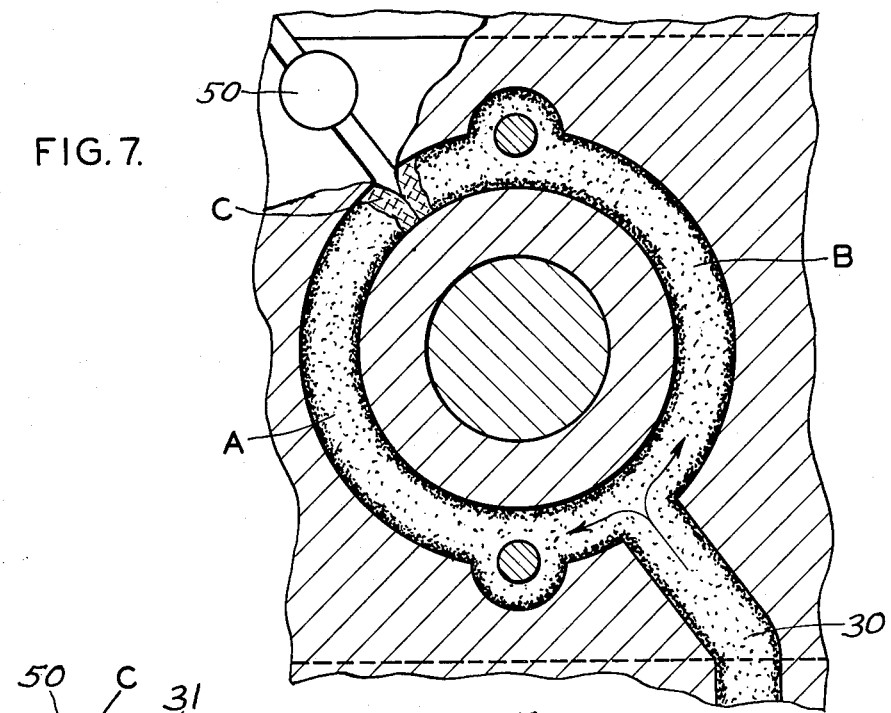
FIGURE 7 is the same sectional view as FIGURE 6 illustrating the condition of the mold at the point just prior to completion of the molding operation.
Figure 8:
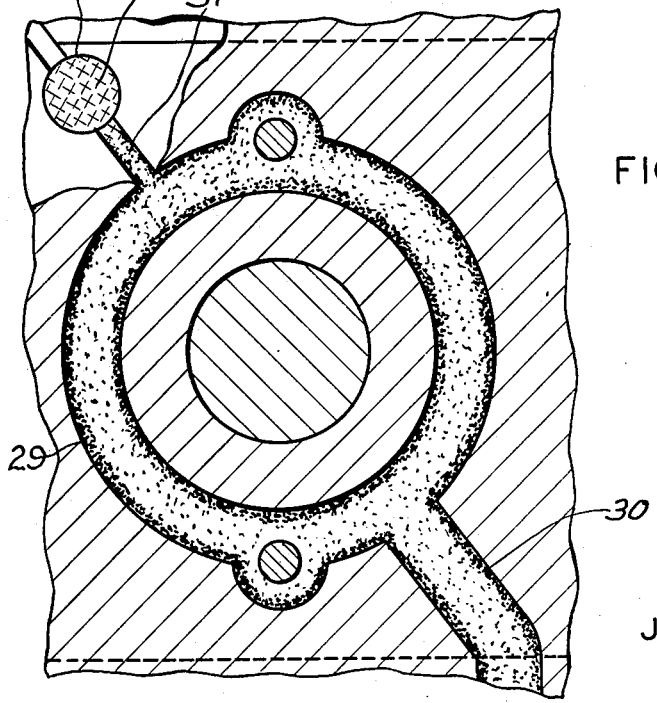
FIGURE 8 illustrates the condition of the mold after the completion of the molding operation but before the insulating material has solidified in the mold; and, FIGURE 9 is a section along line 9—9 in FIGURE 6 showing a cross section through the bleed hole and reservoir provided for each mold cavity.

In the molding operation, the molten plastic material is forced under great pressure into the mold cavity, designated generally by the numeral 29 in FIGURES 6, 7, and 8, to completely embed the medial portions of the fingers 14. As shown in FIGURE 6, the material enters the cavity through a gate 30 and flows in opposite directions around the circular cavity at both sides of the strip or group of coplanar fingers 14. As best seen in FIGURE 3, half of the deflectors or projections 24 face one way and the others face the other way, but in each case they face toward the gate 30 so as to deflect the flowing material from one side to the other of the coplanar fingers.

All of the deflectors which face the counter-clockwise flow of plastic material, in the arrangement here employed, project upwardly whereas the others project downwardly. This arrangement can be varied as desired. For example, the deflectors may be arranged with every other one projecting upwardly and every other one projecting downwardly.

Regardless of the arrangement of these deflectors, it has been found that the two streams of molten insulating material, generally designated A and B, will travel around the mold cavity at the same rate of speed and will meet at a point diametrically opposite the place where they enter the mold cavity. It was originally believed that the deflectors 24 could be used to retard the flow of insulating material so as to shift the vertical knitline in the top half of the annular ring so that it would not be in the same vertical plane as the knitline on the lower half of the annular ring. This, it was thought, would greatly reduce the weakness created when the two knitlines were in the same vertical plane.

However, as said above, this could not be done and the two streams of molten material would meet approximately diametrically opposite the point of entrance into the mold cavity regardless of the number of deflecting vanes formed in the metal strip. This, of course, presupposes that the deflecting vanes are not of the type which would substantially block the passage so that it would be impossible for the molded material to flow past it with any degree of freedom.

To solve the problem effectively, it was necessary to provide some means for removing the partially solidified portion of the molding material from the annular cavity. This was done by locating the bleed hole 31 diametrically opposite the gate 30 in each mold cavity. The bleed hole is formed by grooves formed in each half of the mold which mate when the mold is closed to form a narrow passageway leading away from the mold cavity 29. The bleed hole connects the mold cavity to the reservoir 50 which is formed by the relatively large holes 51 and 52 provided in the upper and lower halves of the mold, respectively. This reservoir collects the excess molding material which is forced out of the mold cavity during the molding operation.

Ejector pins 53 and 54 are located in the holes 51 and 52, respectively. These pins are arranged to move relative to the holes 51 and 52 each time the mold is opened at the end of each molding operation. This forces all of the solidified material which collected in the reservoir during the molding operation out of the reservoir to clear the way for the next cycle of the press.

The molding operation is illustrated in its various steps in FIGURES 6, 7, and 8. In FIGURE 6, the insulating material is just entering the mold through the gate 30 and has divided to form the two streams which we shall designate as A and B, stream A traveling clockwise around the mold with stream B traveling counter-clockwise.

In FIGURE 7, the two molten streams have met diametrically opposite the gate 30 and the front portions of each as indicated at C have solidified or partially solidified to the point where they will not allow the two streams to intermix. This would be the condition that would exist in the final product if the bleed port 31 was not provided in the mold. The front portion of each stream begins to solidify first because this material has been in the mold the longest and has picked up sufficient heat from the mold to begin to "set" before the mold is filled. The problem could be solved by cooling the mold between each molding operation, but this solution is obviously prohibitively time-consuming and costly.

In FIGURE 8, the completed molding operation is illustrated. When the condition as illustrated in FIGURE 7 existed, intead of stopping the molding operation additional insulating material was injected into the mold cavity. This forced the front portions of the two streams A and B out through the bleed port 31 into the reservoir provided at 50. This is the condition as shown in FIGURE 8 where the solidified portion C is outside the mold cavity and in the reservoir 50 or in the bleed port 31, as the case may be, whereas only molten insulating material remains in the mold cavity. This results in a good homogeneous mixture of the insulating material and completely eliminates any possibility of a vertical knitline appearing in the stator body.

The bleed hole not only provides means for ridding the mold of partially solidified molding material, but it also provides an escape route for the air in the mold. Previously, the air had to escape from between the two mold sections but this would create back pressure on the incoming molding material and was undesirable so the bleed hole actually performs two functions.

Another feature of the invention is the use of multiple cavity molds with a guide pin for each individual cavity in the mold. As shown in FIGURES 4 and 5, where a five cavity mold is illustrated, the strip 20, after having the perforations and deflectors formed therein and having been cleaned, is passed through the mold generally indicated at 32 where five insulating rings are molded simultaneously. Locating each cluster in its mold cavity are the locating pins 33 which engage the center holes 38 of each group of perforations.

As shown in FIGURE 5, these pins provide means for positively preventing movement of the strip during the molding operation. Therefore, an additional step must be included in the practice of the invention—that of heating the strip to mold temperature before placing the strip in the mold. Otherwise, the cold metal would expand from the heat of the mold when the mold was closed and this would cause tremendous stresses in the metal if it was not free to expand. Consequently, if the strip is not preheated, guide pins could be used only in the center mold cavity 41 so that the metal could expand in both directions upon being heated to mold temperature. This latter system caused too much variation in the position of the perforations in the other cavities and it was particularly noticeable in the outer cavities 43 where the expansion of the metal would be cumulative. Therefore, it is an important and necessary step when practicing this invention with multiple cavity molds to preheat the metal strip so that a guide pin can be used with each mold cavity.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed as my invention is:

1. A method of plastic molding an annular body of insulating material onto a perforated strip of metal comprising the steps of:
   (a) directing the insulating material through a single source into an annular cavity containing the strip of metal,
   (b) dividing the insulating material into two opposing streams,
   (c) moving the streams of insulating material into the sections of the cavity toward a vent opening diametrically opposite the source,
   (d) advancing the streams in each section to fill the mold until the streams of insulating material meet, and
   (e) removing the insulating material from the junction where the streams of insulating material have met by forcing at least the leading portions of the insulating material which has solidified into the vent opening until a homogeneous junction of insulating material is formed.

2. A method of plastic molding an annulus of insulating material onto a perforated strip of metal comprising the steps of:
   (a) directing the insulating material through a single source communicating with the outer periphery of the cavity,
   (b) dividing the insulating material into two opposing streams around the center axis of the annulus,
   (c) moving the streams of insulating material into the cavity solely toward an unrestricted vent opening diametrically opposite the source to form an annulus parallel to the major surface of the strip of metal,
   (d) advancing the streams in a plane parallel to the major surface of the strip of metal to fill the cavity until the streams of insulating material meet at a junction diametrically opposite the source, and
   (e) immediately discharging the insulating material from the junction where the streams of insulating material have met by forcing the insulating material disposed throughout a cross sectional area which has solidified directly into the unrestricted vent opening until a homogeneous junction of insulating material is formed.

3. The method of claim 2 including the step of:
   (a) heating the strip of metal to substantially the curing temperature of the insulating material before molding the annulus of the insulating material thereto.

4. A method of molding an annulus of thermosetting insulating material onto opposite surfaces of a perforated flat strip of metal comprising the steps of:
   (a) directing the insulating material into a cavity containing the strip of metal through a single source,
   (b) guiding equal portions of the insulating material into the annulus disposed on opposite sides of the flat strip of metal,
   (c) dividing the insulating material in the annulus into two opposing streams around the center axis of the annulus,
   (d) moving the opposing streams of insulating material in the annulus in a plane parallel to the major axis of the strip of metal toward a single unrestricted vent opening diametrically opposite the source,
   (e) completely filling the cross sectional area in the annulus disposed on opposite sides of the flat strip of metal until the opposing streams of insulating material meet at the unrestricted vent opening,
   (f) forming bodies of insulating material extending through the perforations in the flat strip of metal to join the insulating material disposed in each of the annular sections, and
   (g) immediately discharging the insulating material from the junction of the annulus where the opposing streams have met by forcing the solidified portions of the insulating material disposed throughout the cross sectional area directly into the single unrestricted vent opening until a homogeneous junction of insulating material is formed.

References Cited in the file of this patent

UNITED STATES PATENTS

| | | |
|---|---|---|
| 1,161,191 | Cook | Nov. 23, 1915 |
| 2,178,774 | Bogoslowsky | Nov. 7, 1939 |
| 2,191,703 | Anderson | Feb. 27, 1940 |

FOREIGN PATENTS

| | | |
|---|---|---|
| 856,040 | Great Britain | Dec. 14, 1960 |